Feb. 24, 1959 J. TESSON 2,874,476
DRAFTSMAN'S INSTRUMENT
Filed Aug. 28, 1956
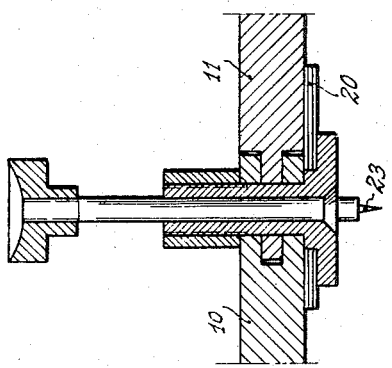
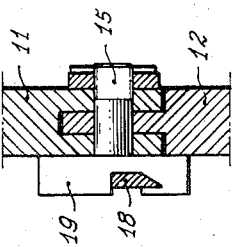
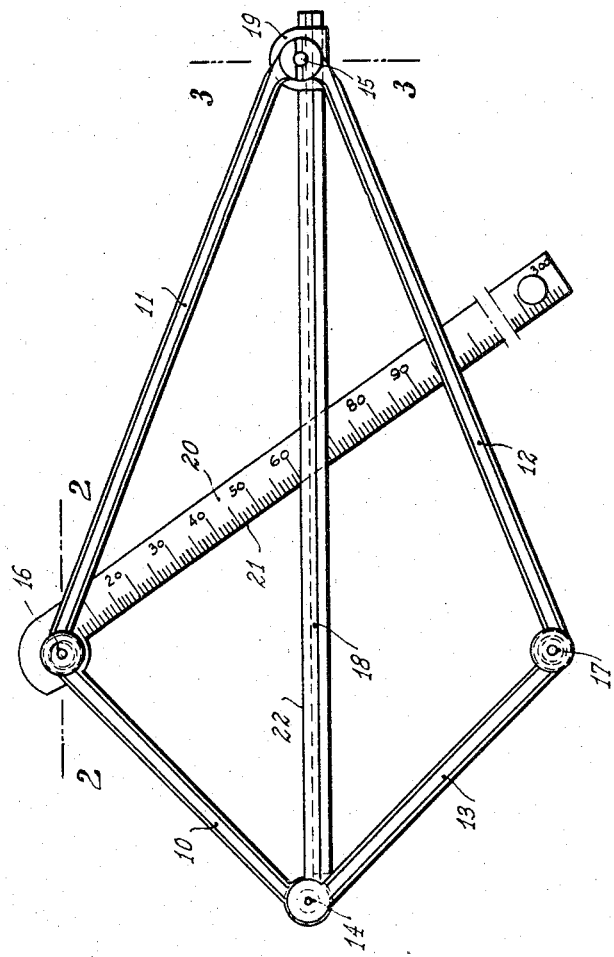

United States Patent Office 2,874,476
Patented Feb. 24, 1959

2,874,476

DRAFTSMAN'S INSTRUMENT

Jean Tesson, Port-Louis (Morbihan), France

Application August 28, 1956, Serial No. 606,704

Claims priority, application France September 16, 1955

2 Claims. (Cl. 33—98)

This invention relates to a draftsman's instrument.

The instrument is devised for the determination, without the use of construction lines, of the center of a circumference passing through two given points and having a given radius.

The instrument is characterized in that it includes four branches forming a quadrilateral with inter-pivoted sides, one diagonal of said quadrilateral, with respect to which the branches are symmetrically disposed in pairs, being provided in the form of a ruler and being pivoted at one end, while the other end is adapted to slide through the opposite vertex of the quadrilateral, and a calibrated ruler being moreover pivoted to one of the remaining vertices of the quadrilateral.

The invention will be clearly understood from the ensuing description given by way of example. The description will refer to the accompanying drawings wherein:

Fig. 1 is a plan view of the instrument;

Fig. 2 is a larger-scale view in section on the line 2—2 of Fig. 1; and

Fig. 3 is also a large scale view in section on line 3—3 of Fig. 1.

The drafting instrument according to the invention comprises four branches 10, 11, 12 and 13 forming a quadrilateral with pivoted sides, the branches 10 and 13, equal in length, being pivoted to each other at 14, and the equal-length branches 11 and 12 are pivoted to each other at 15, while branches 10 and 11 are pivoted to each other at 16 and branches 12 and 13 are pivoted to each other at 17.

Pivotally mounted on the branches 10 and 13 at the junction point 14 between them is a ruler 18 which forms a slideway for a slideblock 19 carried on the pivot 15. A calibrated ruler 20 is moreover pivoted on the vertex 16, with the zero calibration coinciding with said vertex. The said vertex 16 as well as the opposite vertex 17 are formed with a sharp point 23 (see Fig. 2) for positioning the instrument on a sheet of paper or the like.

The instrument is used as follows: The instrument is first placed with the points projecting from the vertices 16 and 17 thereof, in coincidence with the given points through which the circumference is to pass. For this purpose the quadrilateral is distorted both by varying the angles thereof and by sliding the block 19 along the ruler 18. Then the calibrated ruler 20 is rotated about the pivot 16 until the point of intersection between its active edge 21 and the active edge 22 of ruler 18, corresponds with the calibration indicating the length of the given radius for the circumference. The point of intersection indicates the centre of the desired circumference. The instrument will save time and will increase the clearness of a chart or drawing in that it will eliminate the need for construction lines.

What I claim is:

1. An instrument capable of determining the center of a circumference passing through two points and having a given radius comprising two pairs of members, the members of each pair being of equal length, means pivotally connecting the members of each pair, means pivotally connecting the pairs together to form a closed quadrilateral, a diagonal member pivotally connected at the pivotal connection between the members of one pair and slidably connected at the pivotal connection between the members of the other pair for enabling adjustment of the quadrilateral, and a ruler for indicating said radius, said ruler being pivotally connected at only one end to a pivotal connection between the pairs the pivotal connections of which when located on said points cause said diagonal member to indicate the centers of a plurality of circumferences capable of passing through said points, said ruler indicating by intersection with said diagonal member the center of the desired circumference.

2. An instrument as claimed in claim 1 comprising a piercing member at at least one of the pivotal connections between the pairs whereby the instrument can be detachably located on a chart.

References Cited in the file of this patent

UNITED STATES PATENTS 1,660,578    Reppell _____ Feb. 28, 1928

FOREIGN PATENTS 902,686    Germany _____ Jan. 25, 1954